Nov. 30 1943.   J. J. SCHNETZER   2,335,544
FLUID COUPLING SYSTEM
Filed July 24, 1940
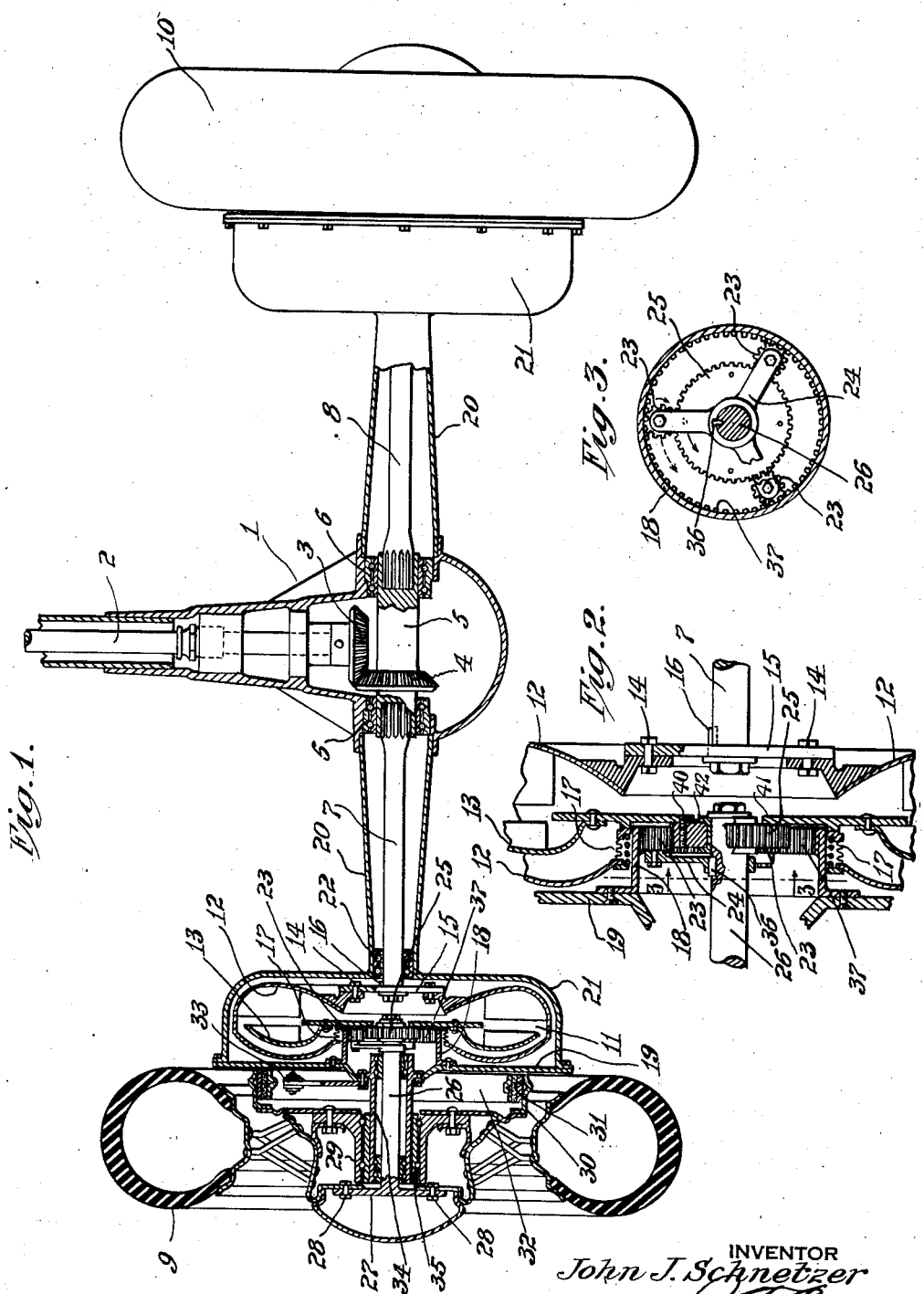
INVENTOR
John J. Schnetzer
BY
ATTORNEY Patented Nov. 30, 1943

2,335,544

UNITED STATES PATENT OFFICE 2,335,544

FLUID COUPLING SYSTEM

John J. Schnetzer, Montclair, N. J., assignor to Joseph F. Ebert, Glen Ridge, N. J.

Application July 24, 1940, Serial No. 347,234

11 Claims. (Cl. 74—189.5)

The invention in its broadest aspects contemplates a system of fluid couplings in which each traction wheel of a motor vehicle may be directly driven independently and separately of the other or others, as the case may be, depending upon whether the system is applied to a two or four wheel driven vehicle.

More particularly the invention contemplates connecting a fluid coupling directly to each of the traction wheels, and combining a planetary gear system as part of the several coupling devices. By such a construction and/or arrangement decided advantages are obtained which become manifest as the description proceeds.

An object of the invention is the provision of a fluid coupling device connected in any desired arrangement between the conventional differential and each of the traction wheels.

Another object is the association of a planetary gear system with a fluid coupling device, which mechanisms may be combined into a unitary structure designed to be inserted between the customary differential and each of the traction wheels.

A special object of the invention is the combination of a planetary gear system with a fluid coupling in a unitary structure mounted in a housing which may form part of, or be carried by, the hub of the wheel.

Another object is to simplify the design of the conventional differential of a motor vehicle by inserting a fluid coupling intermediate the differential gears and each of the driven wheels.

Another object of the invention is to employ fluid couplings so arranged with respect to the several traction wheels that the power impulse translated thereby is self-regulated in accordance with the distance the several wheels travel, as opposed to the amount of resistance offered by a given one of the driven wheels. This avoids the transmission of all the power to a wheel offering little or no resistance.

A further object is to utilize the slip between the driving and driven elements of a fluid coupling, occasioned by change in speed of the vehicle, to accomplish the effect obtained by the use of conventional differential gears, in permitting free relative movement of the traction wheels when negotiating turns or curves.

A still further object is the organization of the power transmission system for propelling motor vehicles which will permit propulsion of the vehicle until such time as there may be a complete failure of power delivered to all of the traction wheels.

Further objects of the invention will manifest themselves upon a reading of the following specification.

I am aware that it has been proposed heretofore to insert a fluid coupling in the transmission system, using that term broadly, but in all such cases the coupling has been inserted either between the engine and the clutch, or between the clutch and the conventional transmission gears. I am also aware that it has heretofore been proposed to insert some form of hydraulic or mechanically operated clutch between the differential and each of the driven wheels but all such clutch mechanisms operate upon a totally different principle from my invention, as will hereinafter be readily appreciated by those skilled in the art.

In accordance with the present invention a fluid coupling is preferably inserted between the differential and each of the rear traction wheels. Associated with each of the couplings is a planetary gear system which may comprise a separate unit or the coupling device and the planetary gear system may be combined in a unitary structure which for the sake of convenience may be mounted in a housing carried by each of the rear wheels. This arrangement has many obvious advantages, as for example it permits the simplification of the differential gear system, the delivery of driving power directly to each of the individual wheels, it affords flexible means permitting the rotation of each of the rear wheels at different speeds so as to permit turning of the vehicle, etc.

My invention is more concerned with the organization and/or location of the various units comprising my modified transmission system than in details of construction of such units. However, such structural features as are disclosed herein are regarded as novel, and although capable of obvious modifications in many respects, embody the essence of the invention contemplated herein.

For the sake of convenience and simplicity of illustration I have chosen to show my invention applied to a motor vehicle having the customary two wheel rear drive, but it will be understood by those skilled in the art, the invention broadly speaking may be applied to any motive power transmission system wherein a fluid coupling may be inserted between a propeller shaft and a driven member so arranged that power impulse is delivered to the driven member independently of any other driven member.

In the accompanying drawing, which shows the invention embodied in a motor vehicle having a rear drive, only so much of the general power retransmission system is illustrated as may be required to appreciate the invention. Referring to the drawing:

Fig. 1 is a sectional view, partly in elevation, of the conventional differential and rear end construction of a motor vehicle, as modified by the invention;

Fig. 2 is a fragmentary, enlarged sectional view of the wheel hub structure; and Fig. 3 is a detail, in section, taken on the line 3—3 of Fig. 2, showing the planetary gear set which is combined with each of the fluid couplings.

As is well known to those skilled in the art, in the operation of a motor vehicle, power is transmitted from a motor, conventionally located in the front, to the rear wheels, by a system of transmitting devices including a clutch, selective transmission gears, propeller shaft, thence through a differential to the axle shaft for each of the rear wheels. A function of the differential which is the last unit in the final drive, is to permit each rear wheel to move independently of the other, which is necessary in order to allow a difference of speed between the two wheels required in turning. This train of transmission or power driving units, has made driving habits rather complicated, and further, has introduced undesirable features, such as allowing the rear wheel which has the lesser traction, absorb the torque of the engine up to a point where movement of the vehicle is impossible, as experienced on slippery road conditions, etc. In what respect my invention has greatly relieved and/or simplified these problems will be explained hereinafter.

Referring to the drawing, the differential unit generally comprises a housing 1, which encloses the end of a propeller shaft 2 having secured thereon a pinion bevel gear 3. In the conventional differential gear system the pinion gear 3 is smaller than the differential gears, and the axle shafts on which said gears are mounted are designed to turn differentially. However, I have modified this conventional arrangement by increasing the size of the pinion gear 3, and providing a mating bevel gear 4, of substantially the same size, and mounted upon a carrier or hub 5. The hub 5 is supported in anti-friction or ball bearings 6, suitably mounted in the housing 1. The carrier hub 5 has each of its ends bored and splined to accommodate the splined ends of axle shafts 7 and 8, and in this manner these shafts are joined or united as a single shaft, so that they are always driven in unison whereby the same amount of developed engine torque is constantly applied to the shafts 7 and 8 irrespective of the traction afforded by the several driving wheels. This feature will be appreciated more fully as the description proceeds.

Inserted between the thusly modified differential comprised of the gears 3 and 4 and the hub 5, and each of the driving wheels 9 and 10, is a fluid coupling device designated generally by the reference character 11, which device may be more or less of a conventional design. As there are at least two of the fluid couplings 11, and may be four in the case of a vehicle having front and rear wheel drive, it is deemed sufficient to illustrate and describe a given one of the couplings, it being understood that the remainder are of identical construction and function similarly.

Each of the couplings 11 may comprise an impeller 12 and a runner 13, each provided with rotor vanes and spaced a suitable distance apart. The impeller 12 may be attached by bolts 14 to a flange 15 which is secured by a key 16 to the end of the drive shaft 7. The shape or contour of the impeller 12 may be such that it is substantially torus-shaped in cross-section and may have a bellows type bearing 17, such as a Sylphon, secured to its free end, which forms an hermetic seal between the impeller 12 and the laterally extending cylindrical flange 18. The casing thus formed by the impeller 12 is adapted to contain the desired quantity of a suitable fluid which is the medium that transmits the motion of the impeller 12 to the runner 13, hereinafter more fully explained. The flange 18 is attached to a supporting plate 19, which plate may form a closure for the axle housing 20, the latter terminating in an enlarged drum-shaped head 21, adapted to enclose the fluid coupling 11 and its associate parts. The outer end of the axle shaft 7 is provided with a ball bearing 22, frictionally or otherwise held in position, and serving as supporting means for the shaft 7.

The planetary gear system which my invention contemplates associating with each of the fluid couplings may be located either following the coupling, or may comprise a separate unit, but I prefer to incorporate it in the same housing, and as part of the same unit forming the fluid coupling. The construction shown comprises a sun gear 25 (see Fig. 2) secured by rivets 40, to a flange or plate 41 forming part of the runner 13 and the sun gear 25 is supported on a bushing 42 carried on the inner end of a wheel driving shaft 26, the outer end of which shaft terminates in a flange 27, secured by bolts 28 to the hub 29, of the driving wheel 9, which may be any form of conventional wheel, as for example the wire type shown. A series of pinion gears 23 attached severally to the arms of a spider 24 fastened to the shaft 26 by a key 36, are in mating engagement with the sun gear 25 and revolve about the the periphery thereof at a differential speed. A stationary orbit or ring gear 37, may be formed internally of the flange 18 and along the outer edge thereof. By this organization of the planetary gears, it will be understood that the runner 13 is driven entirely by the kinetic energy of the fluid contained in the coupling, and being free to rotate upon the wheel driving shaft 26, the gear reduction is effected through the sun gear 25 driving pinion gears 23 connected to the wheel driving shaft 26, so that this shaft always rotates at lower speed than the runner 13, which may be rotated at relatively much higher speed, which is a decided advantage as hereinafter more fully explained.

It will be noted that it is at this point or location in the power transmission system a gear reduction may be made in the final drive members. This gear reduction will be determined by the size of the engine as well as the size of the vehicle, but generally speaking the reduction in gears may be about one-half size as compared to gears embodied in what is known as engine fluid fly wheels, or hydraulic couplings. Because of this fact, the combination of a fluid coupling with a planetary gear set, as herein proposed, makes possible a small compact unit, which in turn makes fluid couplings desirable as rear axle drives. Furthermore, by making the gear reduction between the fluid coupling and the final driven member 26, as in the case of locating the planetary gear set on the hub of the driving wheel, it is possible to build up effective driving speed for the several fluid couplings 11 at low engine speed. This will be appreciated by bearing in mind that the bevel gears 3 and 4 are not only the same size, but are larger than the conventional differential gears and for obvious reasons do not afford any substantial gear reduction to cut down or lower the speed of the drive shafts 7 and 8 which at high speed, in present transmission systems is substantially in the ratio of 1 to 4. By utilizing the planetary gear set as reduction gears, the reduction can be so adjusted that comparatively high speeds may be imparted to the runner 13 at relative engine speeds. That is to say since the impeller 12 is rotated at substantially engine speed, and the reduction is made by the planetary gear set associated with the runner 13, engine impulse may be transmitted at low engine speed sufficient to afford movement or operation of the vehicle, and as this impulse is increased in proportion to the increase in the speed of the engine, the planetary gear set effects a reduction of this engine speed before the engine torque is delivered to the driving wheels. It will therefore be seen that engine impulse may be translated through the couplings 11 at relatively low engine speeds, which in turn makes this form of engine torque or power transmission not only feasible but practical.

The wheel 9 carries the usual brake mechanism comprising a drum 30, linings 31, shoe 32 and lever 33 for actuating these parts, the arrangement and operation of which is well understood by those skilled in the art. The driving shaft 26 may be journaled in ball bearings mounted in a sleeve 34 which in turn is suitably secured within the hub 29, and about which sleeve 34 the wheel 9 may rotate by means of ball bearings 35.

From the foregoing it will be appreciated that the engine torque applied to the propeller shaft 2 will be transmitted through the bevel gears 3 and 4 to the axle shafts 7 and 8. As these shafts are rigidly connected together, the amount of traction of either of the wheels 9 and 10 is immaterial as far as having any effect upon the amount of driving torque transmitted to the individual wheels. The engine torque transmitted to the axles 7 and 8 is translated through the fluid coupling 11 to the driving wheels. This is effected in the first instance by the motion of the impeller 12 being transmitted to the runner 13, rotatably mounted on the bushing 42, by means of the fluid connection therebetween. Of course sufficient speed of rotation must be obtained by the impeller 12 to convert the working fluid or substance into a power translating medium. At low speeds there is sufficient slippage inherent in the fluid couplings to permit a substantial differential between the speed of the driving wheels 9 and 10 to allow all the difference in wheel speed now used by the conventional motor vehicle, thus making it possible to make turns in negotiating curves or changing direction of travel by turning around in a circular or arcuate path. At higher speed the slippage in the fluid couplings will naturally decrease, and the difference in wheel speed will accordingly become less. This decrease in the differential of wheel speeds is accompanied by a corresponding inability to turn sharply, the net result being a very desired stability is obtained which approaches to the ideal at top speeds.

The mode of operation of my fluid coupling system may be described as follows. The propeller shaft 2, as mentioned above, may be connected to the vehicle motor through a simplified conventional transmission system, i. e., one merely provided with two forward gears and a reverse gear. As is customary in starting, the low gear forward is first shafted into connection with the propeller shaft 2. This causes the propeller shaft to rotate and because of the ratio of the bevel gears 3 and 4 being substantially unity, the axles 7 and 8 are caused to turn at the same speed as the propeller shaft 2. Since the axle 7 is directly connected to the impeller 12, the latter is caused to rotate at the same speed, and thus drives or sets in motion the liquid or working substance contained in the coupling housing 11. Because of the axle 7 turning at the same speed as the propeller shaft 2, it is possible to develop a high velocity energy in the fluid of the coupling at relatively low engine speed, thus avoiding racing the motor to start the vehicle when not in motion, or while running at low speed. It also makes available a greater source of power at low engine speed to overcome driving resistance such as encountered in going up steep grades and other conditions of a similar nature.

The engine impulse thus imparted to the liquid or working substance is transmitted to the runner 13, which causes it to rotate about the shaft 26 at a speed gradually approaching the speed of rotation of the impeller 12. The rotation of the runner 13 sets in motion, through the sun gear 25, the pinion or planet gears 23 mounted on the spider 24, the latter being keyed to the shaft 26. The rotation of the shaft 26 is imparted to the wheel 9 since it is connected thereto as explained above. It should be appreciated that the gear reduction effected through the planetary gear system causes the wheel 9 to rotate at all times at less speed than the speed at which the runner 13 is driven, the difference in speeds of rotation depending upon the reduction effected through the design of the planetary gear set. The speed of rotation of the impeller 12 in turn depends upon the gear ratios of the other systems or sets of gears inserted between the motor and the impeller 12, as for example the size and range of the transmission gears, and the amount of change, if any, effected through the bevel gears 3 and 4.

When wishing to go into reverse drive for backing up of the vehicle, the usual transmission gears are shifted into reverse, which in turn imparts a reverse rotation to propeller shaft 2, and the engine torque is transmitted from there to the wheel 9 as just described, except in the reverse order of operation of the elements set in motion.

It is obvious that as the forward speed of the vehicle increases, the difference in rotation of the impeller 12 and the runner 13 will approach unity. As that happens or comes into being, greater stability of driving will be accomplished, approaching an ideal condition. It will only be at relatively low speed that sufficient slippage will occur in the fluid couplings to provide a differential therebetween sufficient to permit sharp turning the vehicle. It will also be observed that because of rigidly connecting the axles 7 and 8, there is provided in effect a single axle, and as long as the propeller shaft 2 receives engine torque it will be transmitted equally and/or independently to each of the wheels 9, so that the amount of traction of a given wheel will have no effect upon the other, and therefore as long as either wheel has sufficient traction for propulsion purposes, it will be impossible to stall the vehicle for lack of traction.

It will also be appreciated that by virtue of my arrangement and construction of the fluid couplings and planetary gear set, the present principle of final power transmission is completely changed, i. e., the fluid couplings are adapted to transmit engine torque simultaneously and also independently, with the result that it is a matter of axle rotation as opposed to wheel rotation as heretofore. My novel arrangement may be stated somewhat differently as being a matter of distance traveled by the driving wheels as contrary to the heretofore relative resistance or traction offered by such wheels.

From the foregoing it is obvious that the present combination and/or arrangement of a fluid coupling with a planetary gear set for each of the driven wheels will greatly simplify the present type of transmission systems. In the place of the conventional transmission gears having several speeds forward, it will be sufficient to provide gears for two forward speeds and a reverse speed gear. The shifting of these gears may be controlled automatically, which would eliminate the usual gear shift lever, or the shifting may be done manually with the gear shift lever but by using fewer positions requiring the shifting of the gears. Further, by employing fluid couplings it is possible to dispense with the clutch as in the case of some of the latest types of automotive power transmission systems.

It is apparent that in my arrangement of the coupling devices, no clutching or declutching is required to place them in operative relation to the propeller shaft and the driven wheels as they are inherently connected therebetween and never become inoperative as long as engine torque is transmitted to the axle shafts, irrespective of the direction the vehicle may be moving. This inherent characteristic of my organization of the coupling devices constitutes them the sole medium of transmitting power directly to the driven wheels. This naturally increases the flexibility of the general transmission system of the entire vehicle, so that a minimum of gear shifting and declutching is required upon the part of the driver. Of course the driving operations may be further simplified by the substitution of an automatic clutch mechanism for the now prevalent or conventional manually operated clutch.

It will be appreciated by those expert in the art that employing fluid couplings as contemplated by the present invention the natural slip inherent in couplings of this type between the impeller and runner, especially when rotating at low speeds, will provide the necessary differential for turning the vehicle in an arcuate path of direction. However the fluid action effecting the connection between the impeller and the runner is such that the difference in wheel travel is kept within quite definite limits as compared to that permitted in the conventional differential constructions. Because of this fact it will always be possible to propel the vehicle irrespective of the relative traction of a given driving wheel.

The term fluid coupling as used herein is employed as designating that type of fluid coupling device in which a fluid per se is the connecting medium between a driving and a driven member, as opposed to devices where a fluid controls mechanical parts which in turn transmit the applied power. These latter devices are sometimes characterized as hydraulic couplings but they are not suited for the purpose in which I use fluid couplings of the type specified.

Many modifications of the arrangement and/or construction illustrated as an embodiment of my invention will readily suggest themselves to those skilled in the art. It is my intention to cover all such modifications as may come within the scope of the appended claims.

What is claimed is:

1. In a driving mechanism for motor vehicles, a fluid coupling having impeller and runner elements, an axle shaft having secured to the outer end thereof the impeller element of the fluid coupling the axle shaft being arranged to be driven substantially at the speed of the propeller shaft, a wheel driving shaft rotatably supporting the runner element of the fluid coupling, and a planetary gear system interposed between the wheel and runner element, whereby a reduction is effected between the speed of the axle shaft and the wheel driving shaft.

2. In a driving mechanism for motor vehicles, a fluid coupling having impeller and runner elements, an axle having a driven wheel mounted upon the end thereof, the wheel mounting including a wheel shaft having the runner element of the fluid coupling rotatably supported thereon, the impeller element of the coupling being secured to the axle and adapted to be driven at substantial unity with a propeller shaft, and a reduction gear system interposed between the runner element and the wheel shaft, the working substance of the coupling constituting the sole means of transmitting power from a prime source to the driven wheel and simultaneously providing sufficient slippage to permit a differential in wheel speed for turning purposes.

3. In a driving mechanism for motor vehicles, a fluid coupling having impeller and runner elements inserted between the propeller shaft and each of the driving wheels, the impeller element of the coupling being arranged to be driven at substantially the speed of the propeller shaft, whereby a high velocity energy is developed in the working substance of the coupling at low engine speeds, the runner element of the coupling being free to rotate on a wheel driving shaft, and a planetary gear system interposed between the runner and the wheel shaft, the several fluid couplings and associated planetary gear systems forming a unitary structure enclosed in a housing mounted adjacent each of the driving wheels.

4. In a motive power transmission system for motor vehicles, in combination, a propeller shaft driven through suitable connections from the motor, a pair of driving axles rigidly connected together and geared at their point of connection to the propeller shaft at a ratio of substantial unity, a pair of fluid couplings each having impeller and runner elements, the outer end of each of the axles having secured thereto the impeller element of one of the fluid couplings, whereby each of the impeller elements are rotated in substantial unison with the propeller shaft, a shaft for each of a pair of driven wheels having one end connected to the wheel and the other to a set of pinion gears forming part of a planetary system, a sun gear of each system being fastened to the runner element of its associated coupling and rotatably mounted upon the wheel shaft in operative relation to the planet pinions, a ring gear in mating engagement with the planet pinions and suitably held from rotation, the ratio of the sun gear to the planet pinions being such that a substantial gear reduction is effected between the speed of rotation of the wheel shaft and the runner element carried thereby.

5. In a motive power transmission system for motor vehicles, in combination, a propeller shaft driven through suitable connections from the motor, an axle forming a single drive shaft, said shafts being geared to each other at a ratio of substantially unity, a fluid coupling having impeller and runner elements interposed between said shaft gearing and each end of the drive shaft, and mounted upon each of the free ends of the drive shaft, the impeller element of each coupling being severally secured to the drive shaft, a wheel shaft attached to each of the driven wheels, the runner element of each coupling being severally supported by the wheel shafts, and a reduction gear system interposed between the runner element of each coupling and its associated wheel shaft, whereby effective driving speed may be developed at low engine speed and the working substance of the coupling constituting the only medium of power transmission between the impeller and the running elements of the several couplings.

6. A motive power transmission system for motor vehicles as claimed in claim 5, wherein the impeller element of the several couplings is constantly driven at propeller shaft speed.

7. A motive power transmission system for motor vehicles as claimed in claim 5, wherein the runner element of the several couplings is free to rotate on its wheel driving shaft.

8. A motive power transmission system for motor vehicles as claimed in claim 5, wherein the elements of the fluid coupling function constantly and without necessitating mechanical engagement and disengagement to meet driving requirements of the vehicle.

9. A motive power transmission system for motor vehicles as claimed in claim 5, wherein each of the reduction gear systems comprises a planetary gear system the sun gear whereof being fastened to the runner element and in operative relation to the planet pinions, and the ring gear in mating engagement with said pinions and suitably held from rotation.

10. A motive power transmission system for motor vehicles as claimed in claim 5, wherein the drive shaft comprises an axle assembly consisting of a pair of axles rigidly connected together by a fastening member designed to be easily disconnected.

11. In a motive power transmission system for vehicles, in combination, a propeller shaft driven through suitable connections from the motor, an axle operatively connected to the propeller shaft and arranged to be driven at substantial unity therewith, an axle housing a driven wheel mounted upon the end of the axle housing, a fluid coupling having impeller and runner elements interposed between the axle and the wheel, the impeller element of the coupling being secured to the axle and the runner element being rotatably supported so as to be capable of rotation in substantial unison with the impeller, the working substance of the coupling constituting the sole means of transmitting power from the impeller to the runner, and a reduction gear system inserted between the runner and the driven wheel, whereby the mechanical advantage inherent in the reduction system is delivered directly to the driven wheel and a high velocity energy developed in the working substance.

JOHN J. SCHNETZER.